(12) United States Patent
Ugrekhelidze et al.

(10) Patent No.: US 7,070,239 B1
(45) Date of Patent: Jul. 4, 2006

(54) CHILD-RESTRAINING VEHICLE SEAT

(76) Inventors: David Ugrekhelidze, 6715 Mission Club Blvd., Apt. 205, Orlando, FL (US) 32821; Vera Demiantchouk, 6715 Mission Club Blvd., Apt. 205, Orlando, FL (US) 32821

( * ) Notice: Subject to any disclaimer, the term of this patent is extended or adjusted under 35 U.S.C. 154(b) by 0 days.

(21) Appl. No.: 11/038,845

(22) Filed: Jan. 21, 2005

(51) Int. Cl.
*A47D 1/10* (2006.01)
*A47D 11/02* (2006.01)
*A47C 13/00* (2006.01)

(52) U.S. Cl. .................. 297/238; 297/105; 297/112; 297/115; 297/236; 297/237

(58) Field of Classification Search ............ 297/238, 297/236, 237, 105, 112, 113, 115
See application file for complete search history.

(56) References Cited

U.S. PATENT DOCUMENTS

| | | | | |
|---|---|---|---|---|
| 2,584,481 A | * | 2/1952 | Mast et al. ................ 297/115 |
| 4,230,366 A | * | 10/1980 | Ruda ..................... 297/238 X |
| 4,533,176 A | * | 8/1985 | Wyttenbach ............... 297/238 |
| 4,540,216 A | * | 9/1985 | Hassel, Sr. ................ 297/238 |
| 4,555,135 A | * | 11/1985 | Freeland ................... 297/105 |
| 4,596,420 A | * | 6/1986 | Vaidya ................... 297/238 X |
| 4,664,443 A | * | 5/1987 | Casale ..................... 297/238 |
| 4,681,367 A | * | 7/1987 | Timmers .................. 297/238 |
| 4,690,449 A | * | 9/1987 | Holman .................. 297/238 X |
| 4,722,568 A | * | 2/1988 | Irvin ....................... 297/238 |
| 4,749,229 A | * | 6/1988 | Dorto ...................... 297/238 |
| 4,768,827 A | * | 9/1988 | Musgrove ................. 297/236 |
| 4,900,086 A | * | 2/1990 | Steward ................... 297/238 |
| 4,913,498 A | * | 4/1990 | Forlivio ................. 297/238 X |
| 4,936,627 A | * | 6/1990 | Guim ...................... 297/238 |
| 4,943,112 A | * | 7/1990 | Law ........................ 297/238 |
| 4,986,600 A | * | 1/1991 | Leblanc et al. ............ 297/238 |
| 5,026,118 A | * | 6/1991 | Vander Stel et al. .... 297/238 X |
| 5,100,199 A | * | 3/1992 | Vander Stel et al. ....... 297/238 |
| 5,106,158 A | * | 4/1992 | Dukatz et al. .......... 297/238 X |
| 5,161,855 A | * | 11/1992 | Harmon .................. 297/238 |
| 5,282,666 A | * | 2/1994 | Demick et al. ............ 297/237 |
| 5,294,182 A | * | 3/1994 | Colasanti ............... 297/238 X |
| 5,328,233 A | * | 7/1994 | Maule ..................... 297/115 |
| 5,385,384 A | | 1/1995 | Gierman et al. ........... 297/238 |
| RE34,868 E | * | 2/1995 | Vander Stel et al. ....... 297/238 |
| 5,403,068 A | * | 4/1995 | Fatchett .................. 297/238 |
| 5,775,771 A | | 7/1998 | La Cour et al. .......... 297/238 |
| 5,829,833 A | | 11/1998 | Handa et al. ............. 297/238 |
| D402,832 S | | 12/1998 | Lance |
| 5,899,534 A | | 5/1999 | Gray ....................... 297/238 |
| 6,089,662 A | | 7/2000 | Lambert et al. ........... 297/238 |
| 6,971,713 B1 | * | 12/2005 | Yuhki et al. .............. 297/113 |
| 6,971,718 B1 | * | 12/2005 | Haglund .................. 297/236 |

* cited by examiner

*Primary Examiner*—Rodney B. White

(57) ABSTRACT

A child-restraining vehicle seat includes a body stored within a vehicle seat and further includes a bottom portion for sitting on and a pull out handle attached thereto to pull the child seat out. The body is formed from material having resilient properties for providing comfort during operating conditions. A plurality of arm rests are detached from and disposed on opposed sides of the body, stored within the vehicle seat and have elongated shapes. A mechanism for extracting the body from the vehicle seat is included. The extracting mechanism includes a plurality of zippers spaced along the vehicle seat. The seat further includes a mechanism for locking the body at a fixed operating position and a fixed non-operating position and also includes a quick-release button attached to the bottom portion of the body.

18 Claims, 3 Drawing Sheets

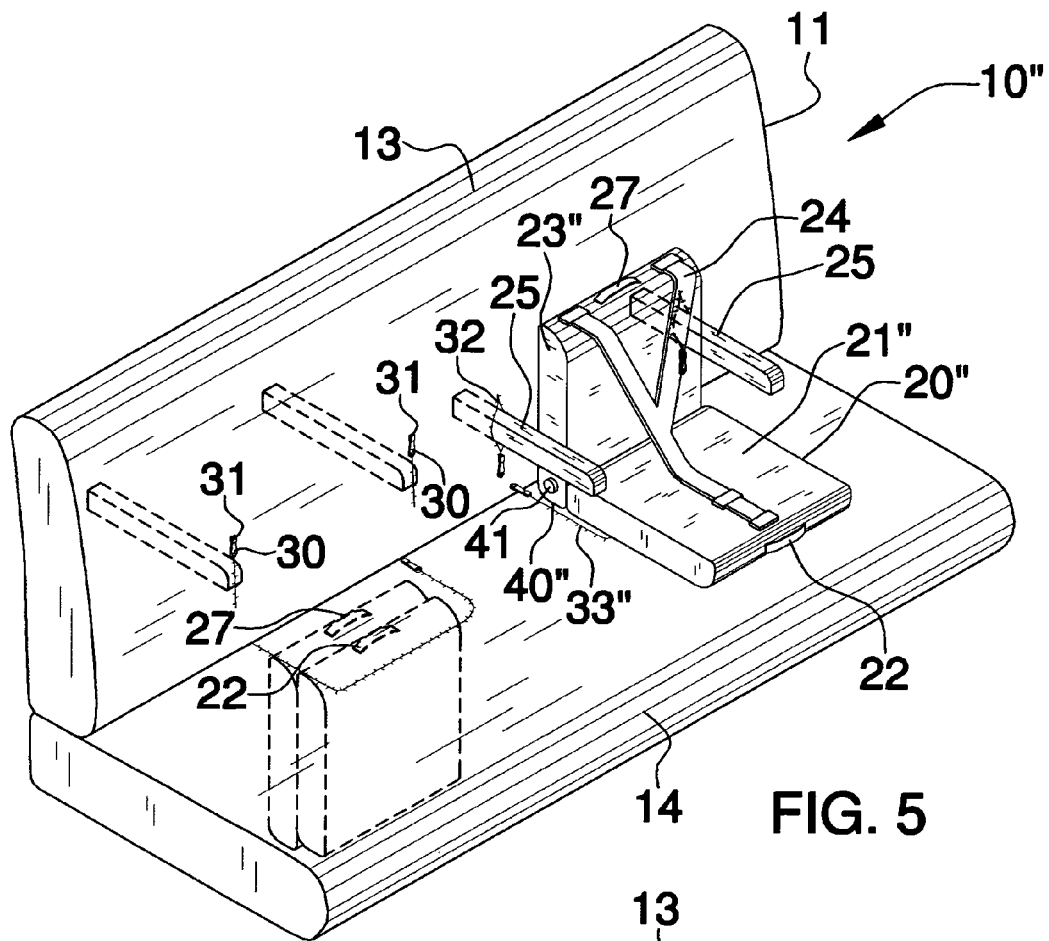
FIG. 5
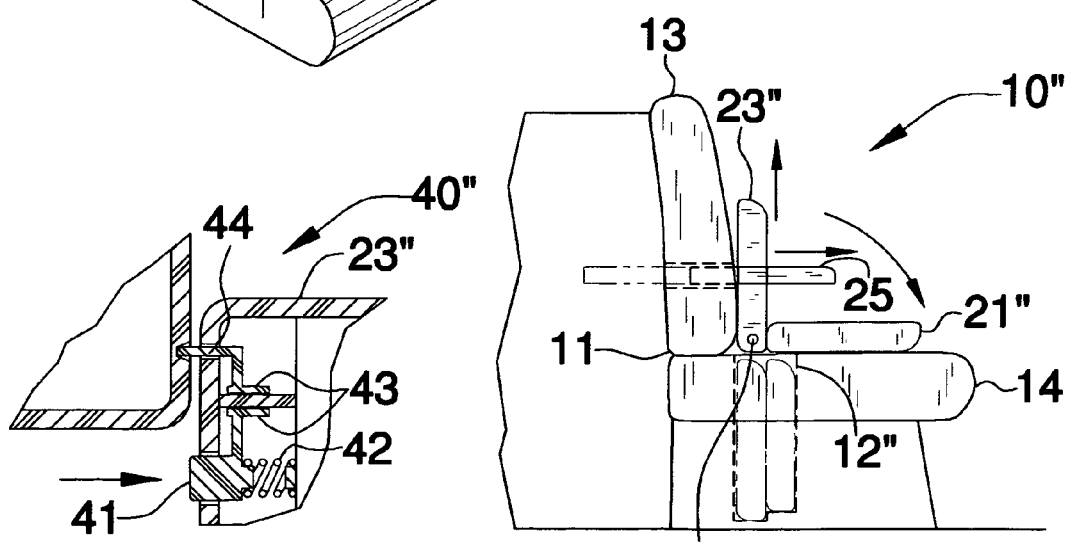
FIG. 7
FIG. 6

CHILD-RESTRAINING VEHICLE SEAT

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a vehicle seat and, more particularly, to a child-restraining vehicle seat for maintaining a child at a safe position while a vehicle is in motion.

2. Prior Art

Virtually all passenger type motor vehicles are now equipped with safety belt restraint systems for physically restraining the seat occupant when the vehicle is subjected to a high rate of deceleration which may occur, for example, during a motor vehicle collision. While such conventional safety belt restraint systems are well suited for restraining adult passengers, it is a common practice to use a portable (i.e., "add-on") child restraint seat having a belt-type harness for children under a given age and weight. As is known, such portable child seats are placed on top of the vehicle seat and secured thereto using the existing vehicular safety belt restraint system. This, however, is a time consuming process that is often done incorrectly when the parents are in a hurry, leading to improper function of the vehicle restraint seat.

In an effort to minimize the inconvenience associated with installing and/or stowing portable child seats, some automotive passenger type motor vehicles are now available with seating arrangements that have a "built-in" or integral child restraint seat integrated into the backrest of an otherwise conventional seat. When the child seat is stowed, the seating arrangement accommodates an adult in a normal seated position while preserving the overall cosmetic appearance and comfort of the vehicle seat.

When needed, the integral child seat can be deployed by rotating a seat member to a lowered operative position and elevating a headrest member to a raised operative position, thereby exposing a belt-type harness restraint provided for physically restraining a child within the seat. Following use, the integral child seat can be stowed by lowering the headrest member and raising the seat member to its respective stowage position concealed within the backrest. It is also common to utilize a latching mechanism for latching the integral child seat in its stowed position. This method of child restraint is obviously unnecessarily complicated and too time and energy consuming to be efficiently applied.

Accordingly, a need remains for a child-restraining vehicle seat in order to overcome the above-noted shortcomings. The present invention satisfies such a need by providing a child-restraining vehicle seat that is easily accessed, effective and provides superior safety to a user. Such a car seat is always readily available for use and requires little effort to setup, thus saving the parents time and energy, and resulting in a more relaxed trip knowing that their child is securely and safely fastened. Parents or other caregivers conveniently do not have to struggle with the awkward and strenuous task of lifting and installing a conventional child-restraining car seat, which can put the child at risk if performed incorrectly.

BRIEF SUMMARY OF THE INVENTION

In view of the foregoing background, it is therefore an object of the present invention to provide a child-restraining vehicle seat. These and other objects, features, and advantages of the invention are provided by a child seat for maintaining a child at a safe position while a vehicle is in motion.

The seat includes a body conveniently stored within a cavity of a vehicle seat such that the body can be repeatedly adapted between operating and non-operating positions. Such a body is advantageously invisible when stored in the non-operating position. The body includes a bottom portion that has a generally rectangular shape for providing a surface area on which a child may sit. The body further has a pull out handle attached thereto for conveniently assisting a user to pull the child seat outwardly from the vehicle seat cavity. Such a body is formed from energy-absorbing material having resilient properties for advantageously providing comfort during operating conditions and further includes substantially linear edge portions extending parallel to each other such that the body can be readily and effectively stored and extracted from the vehicle seat cavity.

In an alternate embodiment, the body preferably further includes a back portion integral with the bottom portion and having a fixed relationship therewith. Such a back portion extends substantially perpendicular to the bottom portion and defines a fulcrum axis about which the seat is pivotal when same is extracted from its stored position. The back and bottom portions are movable between substantially vertical and horizontal positions respectively. The body may further include a seat belt having a substantially Y-shape attachable to the back and bottoms portions.

A plurality of arm rests are detached from the body and independently operable therefrom. Such arm rests are disposed on opposed sides of the body and stored within the vehicle seat cavity such that the arm rests can be selectively extracted therefrom when moved along a substantially horizontal plane and forwardly of the vehicle seat. The arm rests have elongated shapes for assisting a user to slidably extract the arm rests along a linear path from the vehicle seat cavity and each arm rest preferably has a front end portion selectively positionable forwardly of the vehicle seat cavity.

Advantageously, a mechanism for extracting the body from the vehicle seat cavity is included wherein the extracting mechanism is connected to selected portions of the vehicle seat. Such an extracting mechanism is maintained at open and closed positions when the body is adapted between operating and non-operating modes respectively. The extracting mechanism includes a plurality of zippers selectively spaced along the vehicle seat for defining an opening through which the body and the arm rests are effectively extractable. The extracting mechanism preferably defines a pair of oppositely spaced arm rest openings and a body opening having a substantially U-shape. Such arm rest and body openings are formed in a rear portion of the vehicle seat.

The present invention further includes a mechanism for locking the body at a fixed operating position and a fixed non-operating position. Such a locking mechanism conveniently includes a quick-release button attached to the bottom portion of the body.

In yet another embodiment, the body may further include a back portion pivotally connected to the bottom portion wherein the back and bottom portions are positionable below a bottom section of the vehicle seat when at a collapsed position. Such back and bottom portions are vertically extractable from the vehicle seat cavity and pivotally expandable for defining an orthogonal relationship during operating positions. The seat preferably further includes a second pull out handle wherein the pull out handles are attached to the bottom and back portions of the body respectively. The arm rests are conveniently stored rearwardly of the body such that the body can be freely extracted from the vehicle cavity without being obstructed by the arm rests.

In such an embodiment, the locking mechanism further includes a spring member operably connected to the button and a guide member integrally connected to the button and further including a finger end portion protruding outwardly from the bottom portion for being locked with a selected portion of the vehicle seat. Such a finger end portion is releasable from the vehicle seat when the button is adapted to a compressed position.

The extracting mechanism of such an embodiment preferably defines a pair of arm openings and a body opening. Such arm openings have substantially equal lengths and the body opening has a substantially U-shapeformed along the bottom section of the vehicle seat.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 5 is a perspective view showing yet another embodiment of the seat shown in FIG. 1, wherein the seat is stored in the bottom portion of the vehicle seat;

FIG. 6 is a side elevational view of the seat shown in FIG. 5; and

FIG. 7 is a cross-sectional view showing the locking mechanism of the yet another embodiment.

DETAILED DESCRIPTION OF THE INVENTION

Figure 1:
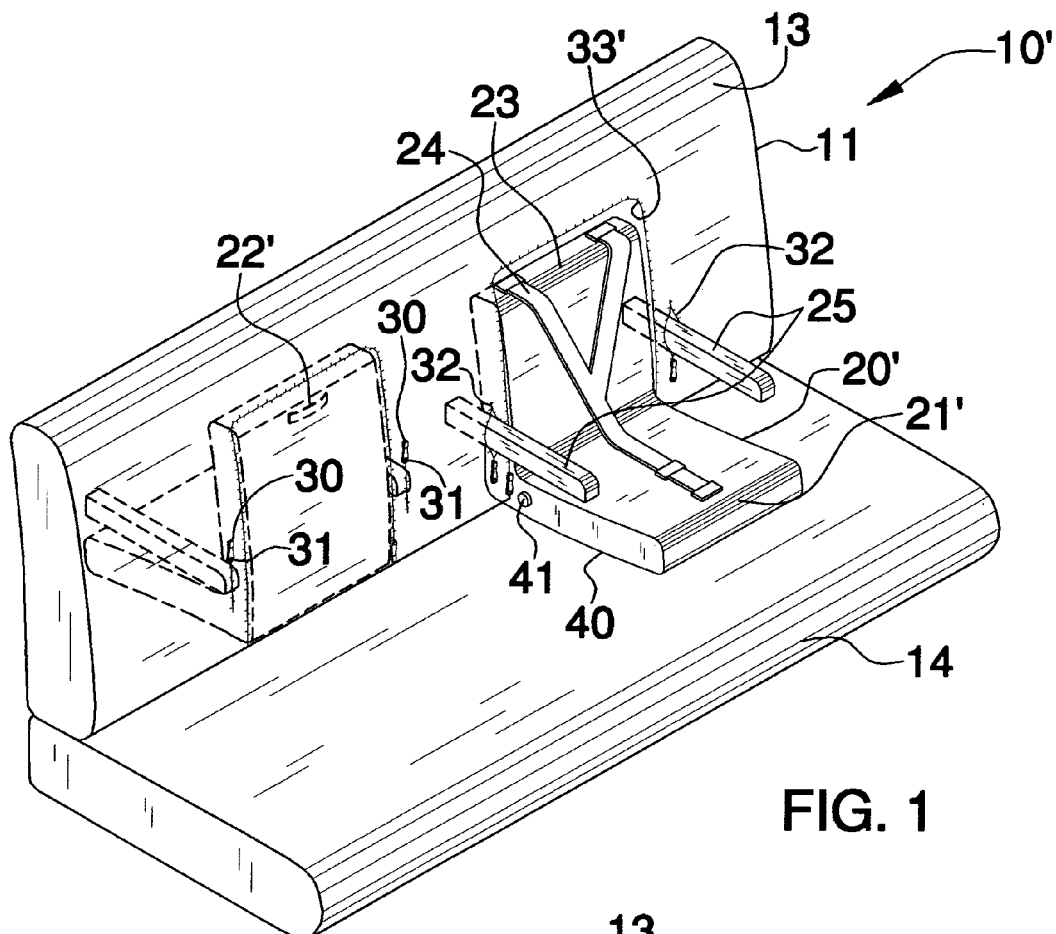
FIG. 1 is a perspective view showing a child-restraining vehicle seat, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to like elements in alternate embodiments.

The apparatus of this invention is referred to generally in FIGS. 1–7 by the reference numeral 10 and is intended to provide a child-restraining vehicle seat. It should be understood that the apparatus 10 may be used to restrain children many different types of vehicles and should not be limited to use in only sedan models.

Referring initially to FIG. 1, in a preferred embodiment, the apparatus 10 includes a body 20 conveniently stored within a cavity 12 of a vehicle seat 11 such that the body 20 can be repeatedly adapted between operating and non-operating positions without having to be removed from the vehicle seat 11. Such a body 20 is advantageously invisible when stored in the non-operating position such that the aesthetic appeal of the vehicle seat 11 is not negatively impacted. The body 20 includes a bottom portion 21 that has a generally rectangular shape for providing a surface area on which a child may sit. The body 20 further has a pull out handle 22 attached thereto for conveniently assisting a user to pull the child seat 10 outwardly from the vehicle seat cavity 12, thus reducing the time and effort required to manipulate the seat 10 between the extracted and stored positions.

Such a body 20 is formed from energy-absorbing material having resilient properties for advantageously providing comfort during operating conditions and further includes substantially linear edge portions extending parallel to each other such that the body 20 can be readily and effectively stored and extracted from the vehicle seat cavity 12. The resilient energy absorbing material allows the seat 10 occupant to be more comfortable, thus advantageously enabling longer trips without the child becoming fussy. In such an embodiment, the vehicle seatbelt (not shown) can conveniently be used to restrain the child in their seat.

Figure 2:
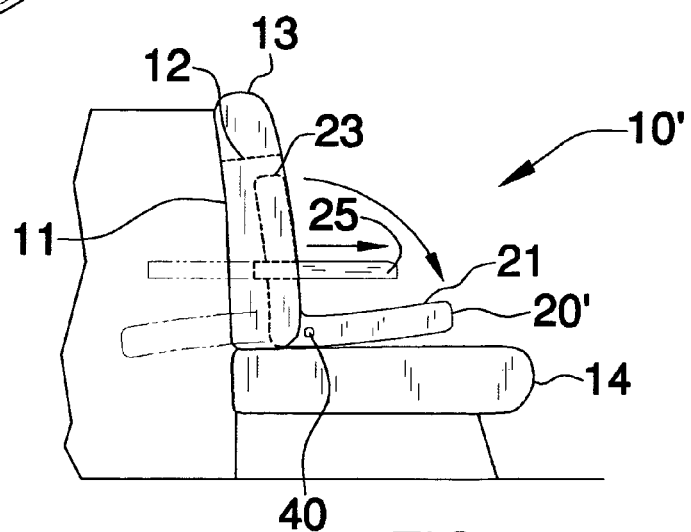
FIG. 2 is a side elevational view of the seat shown in FIG. 1.

Referring to FIGS. 1 and 2, in an alternate embodiment 10', the body 20' further includes a back portion 23 integral with the bottom portion 21' and having a fixed relationship therewith. Such a back portion 23 extends substantially perpendicular to the bottom portion 21' and defines a fulcrum axis about which the seat 10' is pivotal when same is extracted from its stored position. The back 23 and bottom 21' portions are movable between substantially vertical and horizontal positions respectively. The body 20 further includes a seat belt 24 having a substantially Y-shape attachable to the back 23 and bottom 21' portions. Such a seat belt 24 provides extra restraint across the torso section of a child in the event of a sudden stop, thus advantageously reducing the risk of injury to the child.

Still referring to FIGS. 1 and 2, a plurality of arm rests 25 are detached from the body 20 and independently operable therefrom. Such arm rests 25 are disposed on opposed sides of the body 20 and stored within the vehicle seat cavity 12 such that the arm rests 25 can be selectively extracted therefrom when moved along a substantially horizontal plane and forwardly of the vehicle seat 11 and conveniently provide a comfortable seating position for the seat 10 occupant. The arm rests 25 have elongated shapes for assisting a user to slidably extract the arm rests 25 along a linear path from the vehicle seat cavity 12 and each arm rest 25 has a front end portion 26 selectively positionable forwardly of the vehicle seat cavity 12.

Figure 3:
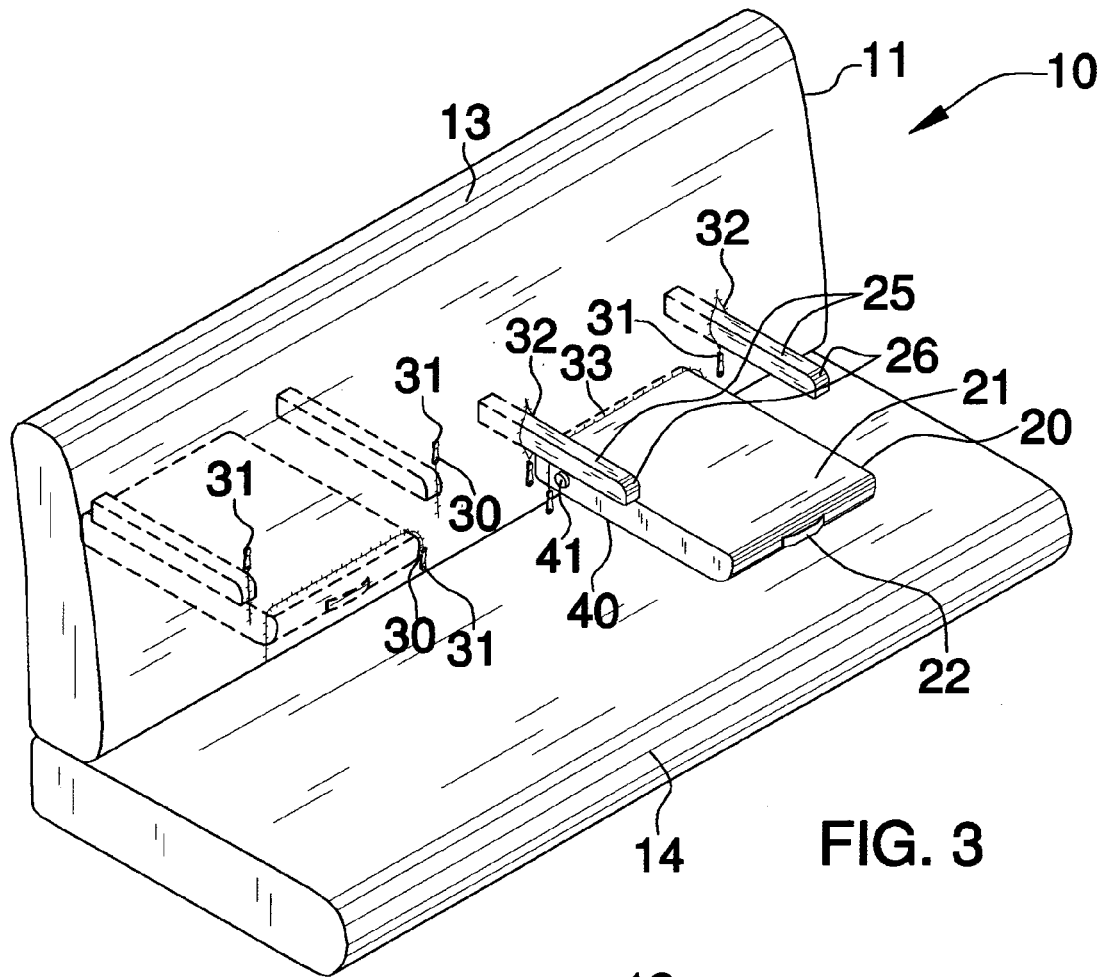
FIG. 3 is a perspective view showing an alternate embodiment of the seat shown in FIG. 1.
Figure 4:
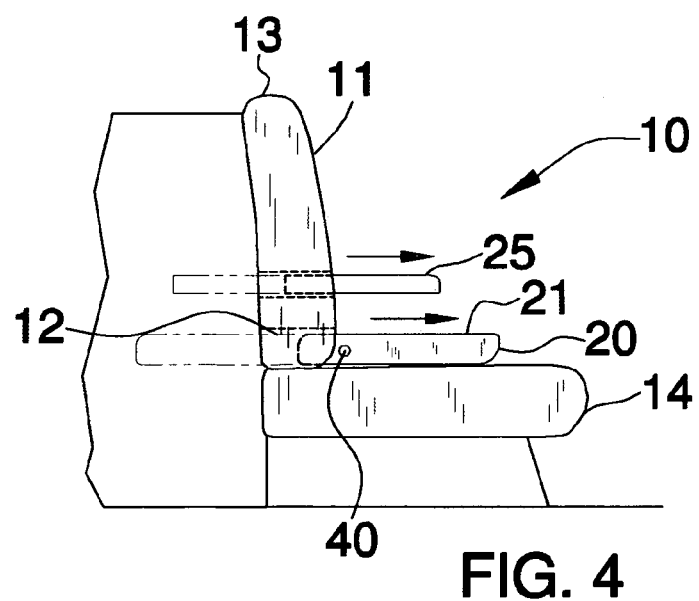
FIG. 4 is a side elevational view of the seat shown in FIG. 3.

Referring to FIGS. 1, 3 and 5, advantageously, a mechanism 30 for extracting the body 20 from the vehicle seat cavity 12 is included wherein the extracting mechanism 30 is connected to selected portions of the vehicle seat 11. Such an extracting mechanism 30 is maintained at open and closed positions when the body 20 is adapted between operating and non-operating modes respectively. The extracting mechanism 30 includes a plurality of zippers 31 selectively spaced along the vehicle seat 11 for defining an opening through which the body 20 and the arm rests 25 are effectively extractable. The extracting mechanism 30 further defines a pair of oppositely spaced arm rest openings 32 and a body opening 33 having a substantially U-shape. In a preferred embodiment 10, such arm rests 32 and body 33 openings are formed in a rear portion 13 of the vehicle seat 11.

Referring to FIGS. 1 and 2, the present invention further includes a mechanism 40 for locking the body 20 at a fixed operating position and a fixed non-operating position. Such a locking mechanism 40 conveniently includes a quick-release button 41 attached to the bottom portion 23 of the body 20 further facilitating and increasing the energy and time-savings qualities of the car seat 10.

Referring to FIGS. 5 and 6, in yet another embodiment 10", the body 20" further includes a back portion 23" pivotally connected to the bottom portion 21" wherein the back 23" and bottom 21" portions are positionable below a bottom section 14 of the vehicle seat 11 when at a collapsed position. Such back 23" and bottom 21" portions are vertically extractable from the vehicle seat cavity 12" and pivotally expandable for defining an orthogonal relationship during operating positions. This embodiment is especially useful in tall cars, such as minivans and Sports Utility Vehicles (SUV's) that have limited trunk space. The seat 10" further includes a second pull out handle 27 wherein the pull out handles 22, 27 are attached to the bottom 21" and back 23" portions of the body 20" respectively. Such handles 22, 27 conveniently assist the user in more easily pulling the body 20" in a vertical direction than would be possible with only one handle 22. The arm rests 25 are conveniently stored rearwardly of the body 20" such that the body 20" can be freely extracted from the vehicle cavity 12" without being obstructed by the arm rests 25.

Referring to FIGS. 5, 6 and 7, in such an embodiment 10", the locking mechanism 40" further includes a spring member 42 operably connected to the button 41 and a guide member 43 integrally connected to the button 41 and further includes a finger end portion 44 protruding outwardly from the bottom portion 23" for being locked with a selected portion of the vehicle seat 11. Such a finger end portion 44 is releasable from the vehicle seat 11 when the button 41 is adapted to a compressed position.

Referring to FIGS. 5 and 6, the extracting mechanism 30" of such an embodiment 10" defines a pair of arm openings 32 and a body opening 33'. Such arm openings 32 have substantially equal lengths and the body opening 33" has a substantially U-shaped formed along the bottom section 14 of the vehicle seat 11.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A child seat in combination with a vehicle seat for maintaining a child at a safe position while a vehicle is in motion, said seat comprising:
    a body stored within a cavity of a vehicle seat such that said body is repeatedly adapted between operating and non-operating positions, said body being invisible when stored in the non-operating position, said body including a bottom portion having a generally rectangular shape for providing a surface area on which a child may sit, said body further having a pull out handle attached thereto for assisting a user to pull said child seat outwardly from the vehicle seat cavity;
    a plurality of arm rests detached from said body and independently operable therefrom, said arm rests being disposed on opposed sides of said body and stored within the vehicle seat cavity such that said arm rests are selectively extracted therefrom when moved along a substantially horizontal plane and forwardly of the vehicle seat;
    means for extracting said body from the vehicle seat cavity wherein said extracting means is connected to selected portions of the vehicle seat, said extracting means being maintained at open and closed positions when said body is adapted between operating and non-operating modes respectively, said extracting means comprising a plurality of zippers selectively spaced along the vehicle seat for defining an opening through which said body and said arm rests are extractable; and
    means for locking said body at a fixed operating position and a fixed non-operating position, said locking means comprising a quick-release button attached to said bottom portion of said body.

2. The seat of claim 1, wherein said body further comprises:
    a back portion integral with said bottom portion and having a fixed relationship therewith, said back portion extending substantially perpendicular to said bottom portion and defining a fulcrum axis about which said seat is pivotal when being extracted from its stored position, said back and bottom portions being movable between substantially vertical and horizontal positions respectively.

3. The seat of claim 2, wherein said body further comprises:
    a seat belt having a substantially Y-shape attachable to said back and bottoms portions, said arm rests having a front end portion selectively positionable forwardly of the vehicle seat cavity;
    said extracting means defining a pair of oppositely spaced arm rest openings and a body opening having a substantially U-shape, said arm rest and body openings being formed in a rear portion of the vehicle seat;

said pull out handle being positioned beneath said bottom section.

4. The seat of claim 1, wherein said body further comprises:
a back portion pivotally connected to said bottom portion wherein said back and bottom portions are positionable below a bottom section of the vehicle seat when at a collapsed position, said back and bottom portions be vertically extractable from the vehicle seat cavity and pivotally expandable for defining an orthogonal relationship during operating positions, said arm rests being stored rearwardly of said body such that said body is freely extracted from the vehicle cavity without being obstructed by said arm rests;
said locking means further comprising
a spring member operably connected to said button, and
a guide member integrally connected to said button and including a finger end portion protruding outwardly from said bottom portion for being locked with a selected portion of the vehicle seat, said finger end portion being releasable from the vehicle seat when said button is adapted to a compressed position.

5. The seat of claim 4, wherein said extracting means defines a pair of arm openings and a body opening, said arm openings having substantially equal lengths and said body opening having a substantially U-shaped formed along the bottom section of the vehicle seat.

6. The seat of claim 4, further comprising: a second pull out handle wherein said pull out handles are attached to said bottom and back portions of said body respectively.

7. A child seat in combination with a vehicle seat for maintaining a child at a safe position while a vehicle is in motion, said seat comprising:
a body stored within a cavity of a vehicle seat such that said body is repeatedly adapted between operating and non-operating positions, said body being invisible When stored in the non-operating position, said body including a bottom portion having a generally rectangular shape for providing a surface area on which a child may sit, said body further having a pull out handle attached thereto for assisting a user to pull said child seat outwardly from the vehicle seat cavity, said body being formed from energy-absorbing material having resilient properties for providing comfort during operating conditions;
a plurality of arm rests detached from said body and independently operable therefrom, said arm rests being disposed on opposed sides of said body and stored within the vehicle seat cavity such that said arm rests are selectively extracted therefrom when moved along a substantially horizontal plane and forwardly of the vehicle seat;
means for extracting said body from the vehicle seat cavity wherein said extracting means is connected to selected portions of the vehicle seat, said extracting means being maintained at open and closed positions when said body is adapted between operating and non-operating modes respectively, said extracting means comprising a plurality of zippers selectively spaced along the vehicle seat for defining an opening through which said body and said arm rests are extractable; and
means for locking said body at a fixed operating position and a fixed non-operating position, said locking means comprising a quick-release button attached to said bottom portion of said body.

8. The seat of claim 7, wherein said body further comprises:
a back portion integral with said bottom portion and having a fixed relationship therewith, said back portion extending substantially perpendicular to said bottom portion and defining a fulcrum axis about which said seat is pivotal when being extracted from its stored position, said back and bottom portions being movable between substantially vertical and horizontal positions respectively.

9. The seat of claim 8, wherein said body further comprises:
a seat belt having a substantially Y-shape attachable to said back and bottoms portions, said arm rests having a front end portion selectively positionable forwardly of the vehicle seat cavity;
said extracting means defining a pair of oppositely spaced arm rest openings and a body opening having a substantially U-shape, said arm rest and body openings being formed in a rear portion of the vehicle seat;
said pull out handle being positioned beneath said bottom section.

10. The seat of claim 7, wherein said body further comprises:
a back portion pivotally connected to said bottom portion wherein said back and bottom portions are positionable below a bottom section of the vehicle seat when at a collapsed position, said back and bottom portions be vertically extractable from the vehicle seat cavity and pivotally expandable for defining an orthogonal relationship during operating positions, said arm rests being stored rearwardly of said body such that said body is freely extracted from the vehicle cavity without being obstructed by said arm rests;
said locking means further comprising
a spring member operably connected to said button, and
a guide member integrally connected to said button and including a finger end portion protruding outwardly from said bottom portion for being locked with a selected portion of the vehicle seat, said finger end portion being releasable from the vehicle seat when said button is adapted to a compressed position.

11. The seat of claim 10, wherein said extracting means defines a pair of arm openings and a body opening, said arm openings having substantially equal lengths and said body opening having a substantially U-shaped formed along the bottom section of the vehicle seat.

12. The seat of claim 10, further comprising: a second pull out handle wherein said pull out handles are attached to said bottom and back portions of said body respectively.

13. A child seat in combination with a vehicle seat for maintaining a child at a safe position while a vehicle is in motion, said seat comprising:
a body stored within a cavity of a vehicle seat such that said body is repeatedly adapted between operating and non-operating positions, said body being invisible when stored in the non-operating position, said body including a bottom portion having a generally rectangular shape for providing a surface area on which a child may sit, said body further having a pull out handle attached thereto for assisting a user to pull said child seat outwardly from the vehicle seat cavity, said body being formed from energy-absorbing material having resilient properties for providing comfort during operating conditions, said body further comprising substantially linear edge portions extending parallel to each other such that said body can be readily and effectively stored and extracted from the vehicle seat cavity;

a plurality of arm rests detached from said body and independently operable therefrom, said arm rests being disposed on opposed sides of said body and stored within the vehicle seat cavity such that said arm rests are selectively extracted therefrom when moved along a substantially horizontal plane and forwardly of the vehicle seat, said arm rests having elongated shapes for assisting a user to slidably extract said arm rests along a linear path from the vehicle seat cavity;

means for extracting said body from the vehicle seat cavity wherein said extracting means is connected to selected portions of the vehicle seat, said extracting means being maintained at open and closed positions when said body is adapted between operating and non-operating modes respectively, said extracting means comprising a plurality of zippers selectively spaced along the vehicle seat for defining an opening through which said body and said arm rests are extractable; and means for locking said body at a fixed operating position and a fixed non-operating position, said locking means comprising a quick-release button attached to said bottom portion of said body.

14. The seat of claim 13, wherein said body further comprises:

a back portion integral with said bottom portion and having a fixed relationship therewith, said back portion extending substantially perpendicular to said bottom portion and defining a fulcrum axis about which said seat is pivotal when being extracted from its stored position, said back and bottom portions being movable between substantially vertical and horizontal positions respectively.

15. The seat of claim 14, wherein said body further comprises:

a seat belt having a substantially Y-shape attachable to said back and bottoms portions, said arm rests having a front end portion selectively positionable forwardly of the vehicle seat cavity;

said extracting means defining a pair of oppositely spaced arm rest openings and a body opening having a substantially U-shape, said arm rest and body openings being formed in a rear portion of the vehicle seat;

said pull out handle being positioned beneath said bottom section.

16. The seat of claim 13, wherein said body further comprises:

a back portion pivotally connected to said bottom portion wherein said back and bottom portions are positionable below a bottom section of the vehicle seat when at a collapsed position, said back and bottom portions be vertically extractable from the vehicle seat cavity and pivotally expandable for defining an orthogonal relationship during operating positions, said arm rests being stored rearwardly of said body such that said body is freely extracted from the vehicle cavity without being obstructed by said arm rests;

said locking means further comprising a spring member operably connected to said button, and a guide member integrally connected to said button and including a finger end portion protruding outwardly from said bottom portion for being locked with a selected portion of the vehicle seat, said finger end portion being releasable from the vehicle seat when said button is adapted to a compressed position.

17. The seat of claim 16, wherein said extracting means defines a pair of arm openings and a body opening, said arm openings having substantially equal lengths and said body opening having a substantially U-shaped formed along the bottom section of the vehicle seat.

18. The seat of claim 16, further comprising: a second pull out handle wherein said pull out handles are attached to said bottom and back portions of said body respectively.

* * * * *